Figure 1:
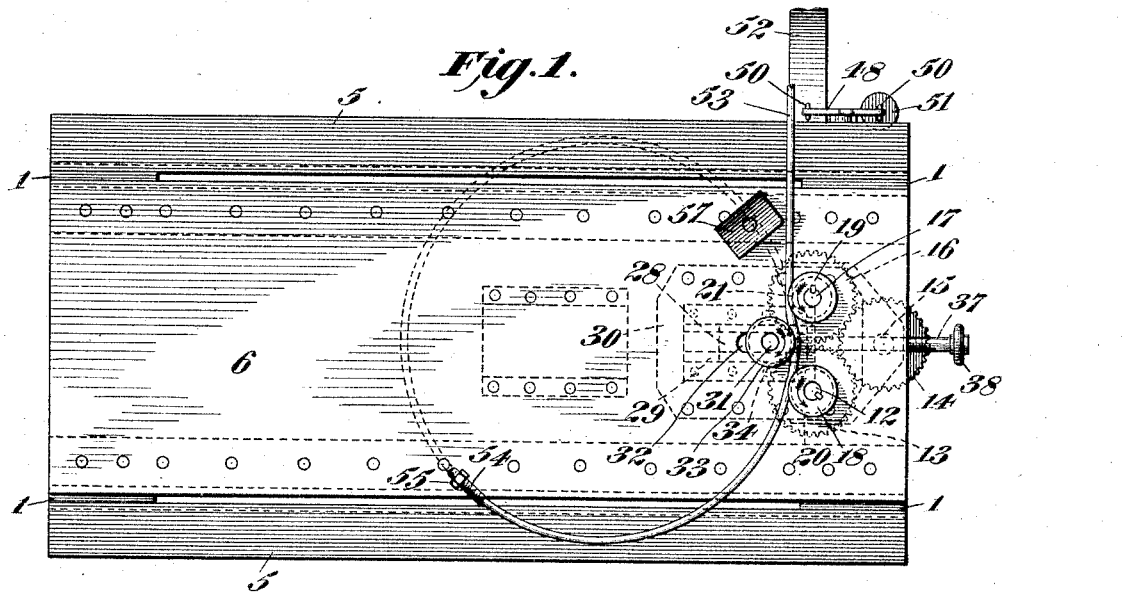

C. N. REPLOGLE.
BENDING MACHINE.
APPLICATION FILED JUNE 19, 1912.

1,068,078.

Patented July 22, 1913.

2 SHEETS—SHEET 1.

WITNESSES,
Elmer Seavey
J. F. Grogan

INVENTOR.
Chas. N. Replogle
by Geo. E. Thackray
his ATTORNEY.

C. N. REPLOGLE.
BENDING MACHINE.
APPLICATION FILED JUNE 19, 1912.
1,068,078.
Patented July 22, 1913.
2 SHEETS—SHEET 2.
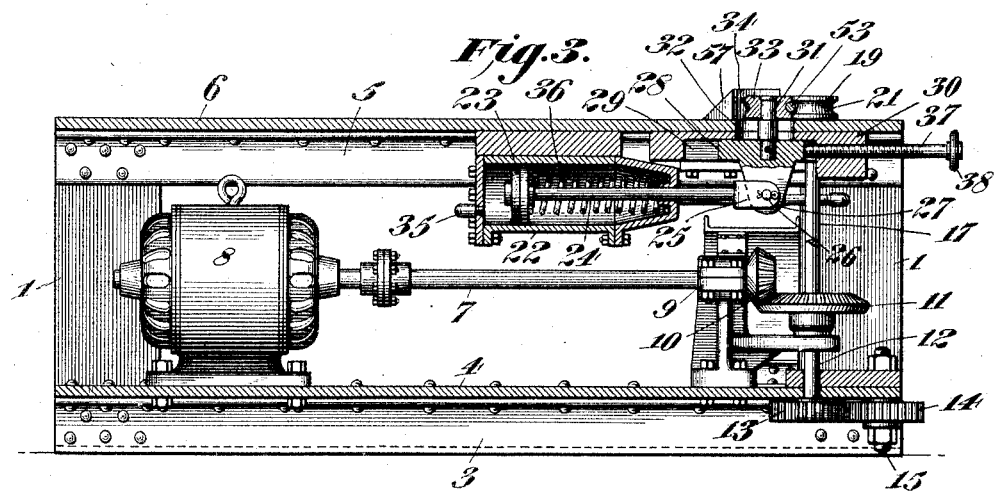
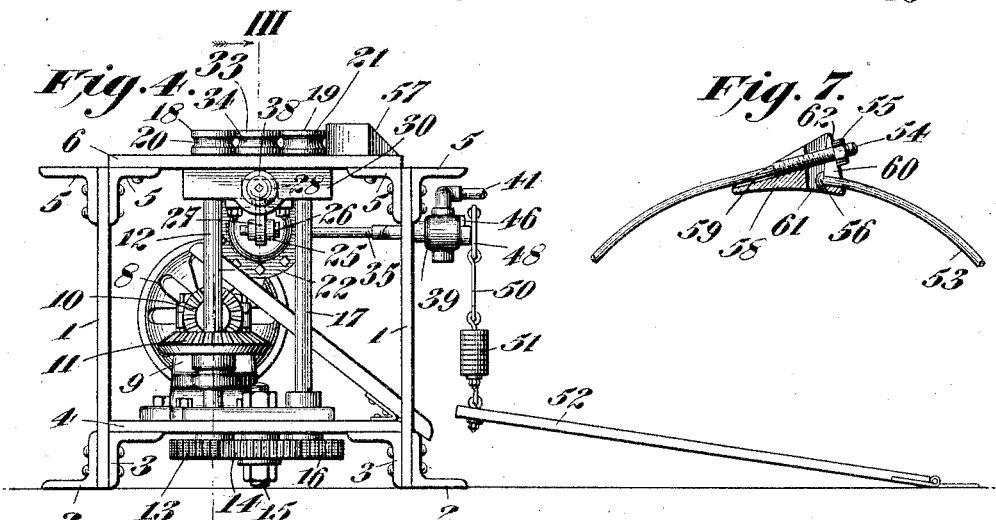
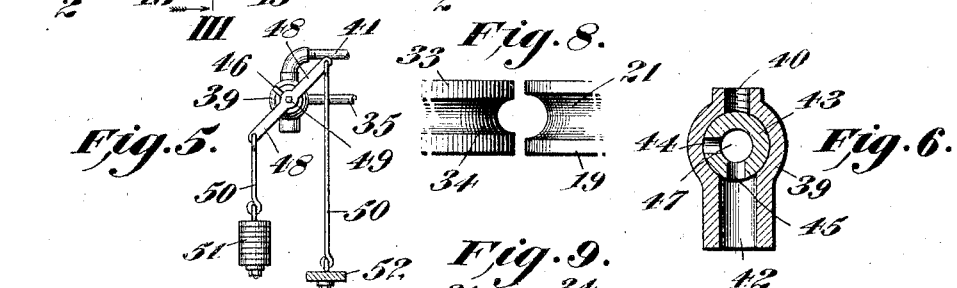
WITNESSES.
Elmer Seavey
J. F. Grogan
INVENTOR.
Chas. N. Replogle
by Geo. E. Thackray
his ATTORNEY

UNITED STATES PATENT OFFICE.

CHARLES N. REPLOGLE, OF WESTMONT, PENNSYLVANIA.

BENDING-MACHINE.

1,068,078.

Specification of Letters Patent.

Patented July 22, 1913.

Application filed June 19, 1912. Serial No. 704,478.

*To all whom it may concern:*

Be it known that I, CHARLES N. REPLOGLE, a citizen of the United States, residing in the borough of Westmont, in the county of Cambria and State of Pennsylvania, have invented certain new and useful Improvements in Bending-Machines; and I do hereby declare the following to be a full, clear, and exact description of the invention, such as will enable others skilled in the art to which it appertains to make and use the same.

My invention relates to improvements in machinery for bending bars, pipes, rods or tubes and more particularly to an improved machine whereby is facilitated the forming of such bands as are intended for hoops to gird and bind the staves used in constructing wooden pipe-lines, tanks, etc.

In order to simplify the description and illustrations I will show and describe a band of round section with head on one end and rolled thread and nut on the other end, bent to required form in my machine, but I wish it understood that I may adapt my machine to make other forms as may be desired and either full circles or part circles.

The band shown and described herein, comprises a round rod of metal of proper length bent into a substantially circular form, with a head formed on one end, while the opposite end is upset by rolling the thread thereon to receive the nut. When placed in position upon the pipes the encircling band acts in conjunction with a nut and a metal connecting clamp or shoe by means of which the band extremities are securely held and so controlled as to enable the band to be drawn to its required tight fit upon the pipe by screwing up the nut.

To afford the greatest convenience in affixing a band upon the circumference of a pipe, with a minimum amount of time and labor it is very necessary that the band has been previously bent to the most suitable form, so that it may be easily placed about the pipe at the point desired, with its headed and threaded ends conveniently applicable to their intended positions within the connecting clamp or shoe. Such a suitable form of band has for the greater part of its length a bend, the radius of curvature of which is the same or slightly greater than that of the outer circumference of the pipe for which the band is intended. The end of the band having the thread for the nut is not so curved, however, but for a suitable distance, including the threaded end, is straight and tangent to the arc or curvature of the bent part of the length of the band, thereby rendering the threaded end conveniently accessible to its intended position in the connecting clamp and permitting therein the required tightening of the band upon the pipe by means of the nut. The other end of the band on which is formed a head is also straight for a shorter distance, where it is inserted in the notch of the clamp in order to better fit and perform its desired functions.

One of the objects of my invention is to provide an improved machine for forming the straight rods into pipe bands of the desired shape and size at one operation, with a minimum requirement of time and labor.

Another object is the manner of adjusting the pressure roll whereby I am enabled to produce bands of different sizes and radii or curvature.

A still further object of my invention is to construct a machine which can be easily transported from place to place within the shop or elsewhere by means of a crane or other power.

My invention also comprises a particular construction and arrangement of the grooves in the rolls, to allow the head of the band to pass without deformation.

With these objects in view, my invention comprises certain novel constructions, combinations and arrangements of parts, as will be hereinafter more fully described and pointed out in the appended claims.

Referring now to the accompanying two sheets of drawings forming part of this specification, in which:—

Figure 2:
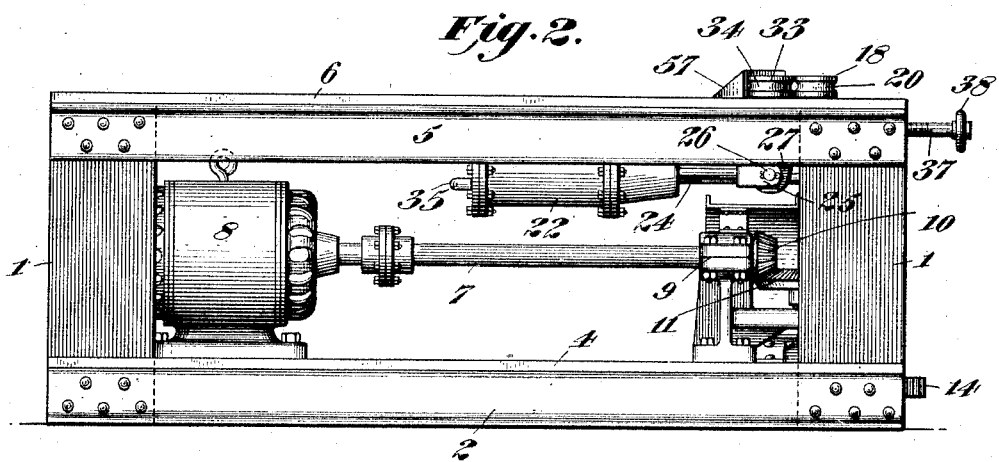

Figure 1 is a top plan view of my band bending machine, showing a rod being bent to form a pipe band, the threaded end having been first fed to the machine beyond the rolls; the dotted lines indicating the approximate path of the band, as the operation progresses. Fig. 2 is a front elevation illustrating my machine with an electric motor for rotating the feed rollers. Fig. 3 is a vertical longitudinal section taken on the line III—III of Fig. 4 showing parts in elevation. Fig. 4 is an end elevation of my machine showing especially the foot controlling mechanism of the valve through means of which the bending mechanism of the machine is controlled. Fig. 5 is a detail view of the controlling valve in elevation, with operating mechanism attached thereto. Fig. 6 is a vertical transverse section of the controlling valve taken on a line with the exhaust. Fig. 7 is a vertical longitudinal section taken through the central portion of a pipe band connecting clamp, showing the ends of the pipe bands attached thereto in elevation, and in the position they will assume when fastened upon a pipe. Fig. 8 is a detail view on an enlarged scale illustrating the grooving of the rolls used to bend and feed the pipe band rods through the machine, one of the grooves being made larger and of greater depth than the other, in order to enable the headed end of the rod to pass without injury. Fig. 9 is a diagrammatic view in plan showing the grooved pressure roll retracted so that the upset threaded end of the rod may be placed between the roll in the position indicated.

In the drawings in which like characters of reference designate corresponding parts throughout the several views:—the structural frame work of the machine is shown as of rectangular form comprising vertical plate standards 1 at each corner connected together in pairs on each longitudinal side at their lower ends by the angles 2 the horizontal flanges of which are flush with the floor or foundation, and act as feet for the machine, and inner angles 3, the horizontal flanges of which extend inwardly for attaching a base plate 4 thereto, while their vertical legs extend downwardly and are riveted to the vertical upwardly extending legs of the angles 2 through the standards 1. The upper ends of the standards 1 are also connected together longitudinally at the sides in pairs by angles 5 on their inner and outer faces. These angles 5 are placed back to back and riveted together through the standards 1 with their horizontal flanges extending outwardly therefrom on either side flush with the top ends of the standards 1. A plate 6 connects together the inner horizontal flanges of the angles 5 and forms the operating platform for the machine.

The power shaft is indicated at 7, which I prefer to drive direct by a motor 8 mounted on the base plate 4, as shown, or by any other suitable means. The power shaft has a suitable bearing block 9 and a bevel pinion 10 attached to its outer end which meshes with a bevel gear 11 keyed to a vertical shaft 12, to the lower end of which, beneath the base plate is secured a gear 13 which meshes with an idler gear 14 adapted to rotate on a stub shaft 15 attached to the base plate 4. This idler gear also meshes with a gear 16 keyed to the bottom end of a vertical shaft 17 extending parallel with the shaft 12. These three gears 13, 14 and 16 are all of the same size which, through the interposition of the idler gear 14 enables the shafts 12 and 17 to rotate at the same speed and also in the same direction.

The shafts 12 and 17 have suitable bearings attached to and formed in the table and base plates 6 and 4 and to the upper ends of the shafts are keyed or otherwise secured the rolls 18 and 19, which act as the feed rolls, each of which has around its periphery an annular groove as shown at 20 and 21. The groove 21 on the roll 19 mounted on the upper end of shaft 17 is wider and deeper, as clearly illustrated in Fig. 8 of the drawings, in order to allow the headed end of the band to pass without injury at the completion of the bending operation.

Attached to the under side of the table plates 6 at an intermediate point is a cylinder 22 having a piston 23 and rod 24 which extends outwardly through the cylinder head ending in a clevis 25 for pivotally connecting, by means of a lateral pin 26, the downwardly extending ear 27 of a slide 28, which slide is mounted and adapted to reciprocate in a slideway 29, formed in a slideway bearing block 30 attached to the under side of the table plate 6 in front of cylinder 22.

A socket is formed in the upper face of the slide 28 in which is seated and rigidly secured thereto a stub shaft 31 extending upwardly therefrom through a longitudinal slot formed in the table plate 6 and the bearing block 30 as shown at 32. This slot is made centrally between the rolls 18 and 19 but at one side thereof and at right angles to a line between the two. An idler pressure roll 33 having an annular groove 34 around its periphery similar to roll 18 is mounted on the upper end of this stub shaft and in the same plane as the rolls 18 and 19 but in staggered relation thereto.

The idler presser roll 33 is adapted to be projected forward through its connections by fluid pressure which enters the cylinder, at the rear of the piston 23 through a pipe 35 and retracted by means of a helical spring 36 which surrounds the piston rod 24 between the front end of the cylinder and the piston and returns the piston 23 to its normal position at the rear end of the cylinder after the exhaust of the fluid pressure.

In order to produce different sized bands the forward movement of the slide is controlled by means of a stop 37, comprising a threaded rod which is screwed into the end of the slideway bearing block 30 and operated by a handwheel 38.

39 indicates the controlling valve casing having an inlet port 40 for attaching a pipe connection 41 through which is received the fluid pressure from any suitable source of supply, and an exhaust port 42. A rotary three-way plug valve 43 which has inlet and exhaust ports 44 and 45 made to register as desired with the ports 40 and 42 by means of a stop 46, has a central outlet port 47 for communicating with the pipe 35 for admitting and exhausting the fluid pressure to and from the cylinder 22. A rocker arm 48 is attached to the valve stem 49 with its ends extending outwardly on either side thereof. Eyes are formed in these ends for the reception of the upper ends of the links 50. The lower end of the one of said links has secured thereto a counter weight 51, while the opposite link has its lower end attached to a treadle 52.

Having given a general description of the machine, I will now, in order to make it more clear, describe the rod bending operation of the machine and the mode of attaching the band by means of a clamp to the pipe:—A rod 53 of the required size and length, having preferably an upset roll threaded end portion, as at 54, with a nut 55 screwed thereon, and a headed opposite end, as at 56, is placed upon the table plate 6 between the grooved driving feed rolls 18 and 19, and the idler pressure roll 33, its threaded end extending beyond the rolls in substantially the position shown diagrammatically in Fig. 9. The operator then places his foot upon the treadle 52 and presses it downward which opens the valve and allows the compressed air or other fluid pressure to flow into the cylinder 22, forcing forward the piston 23 and rod 24 with the clevis 25 on its outer end, which is connected by means of the lateral pin 26 to the ear 27 of the slide 28 carrying the stub-shaft 31 upon which the idler pressure roll is mounted. These parts then assume the positions shown in Figs. 1, 2 and 3, the adjustable stop limiting the forward movement of the slide. In this position the rod enters the annular grooves in the peripheries of the pressure roll 33 and the feed driving rolls 18 and 19. These rolls 18 and 19 are continuously driven in the same direction by the motor, through its connections and train of gearing which rapidly drives the rod forward, bending it at the same time, into a circular form between the combined action of the pressure roll 33 and the feed rolls 18 and 19. The forward end of the band as it nears completion runs up the inclined face of a block 57 in order that the end of the band will not come in contact with the rolls. The head of the band at the end of operation passes beyond the roll 19 at which point the pressure roll will not contact with the end of the band. The operator then releases the treadle 52 which is returned to its first position by the counter weight 51 the fluid pressure from the pressure cylinder 22 being exhausted through the exhaust ports 42 and 45, the piston 23 being returned to the rear end of the cylinder by the helical spring 36 carrying with it the mechanism attached thereto. The formed band is then taken away and the operation above described repeated on another rod. A band thus formed has the straight end portions as desired and the forming is completed in one very speedy and economical operation.

In Fig. 7 I have shown the method of attaching the band to the pipe section by means of the usual clamp 58. This clamp has a groove 59 on its upper face and a notch 60 at one end with an opening 61 centrally located between the two. In attaching the band and clamp to the pipe section, the head 56 of the band is first inserted in the opening 61 and the short, straight portion back of the head is seated within the notch 60, the body of the band is then placed around the pipe section, its opposite, threaded end portion is received within the groove 59 extending through the opening 61 and notch 60 and projects beyond the outer wall 62 of the notch 60 which is slightly inclined from the vertical. The face of the groove 59 is slightly inclined from the horizontal, being at right angles to the side wall 62 of the notch 60, so that when the nut 55 is screwed in place upon the threaded end of the band the base of the nut will be flush with the side wall 62 and have a perfect bearing surface.

Although I have shown and described my improvements in considerable detail, I do not wish to be limited to the exact and specific details shown and described, but may use such substitutions, modifications or equivalents thereof, as are embraced within the scope of my invention, or as pointed out in the claims.

Having thus described my invention, what I claim and desire to secure by Letters Patent is:—

1. In a bending machine, a receiving table, a pair of grooved feed-rolls rotatably mounted thereon, the axes of which are arranged at a pre-determined distance apart, the groove in the first acting one of said pair of rolls being larger than the grooves in the other rolls, means for continuously rotating said feed-rolls, a grooved idler pressure-roll reciprocably and rotatably mounted on said table opposite to and in staggered relation with the pair of feed-rolls aforesaid, and means below the receiving table for moving said idler pressure-roll transversely to and from the opposing surfaces of the feed-rolls aforesaid.

2. In a band bending machine, a receiving table, a pair of continuously rotating feed rolls mounted apart thereon, adapted to engage one side of the rod to be bent, an idler pressure roll mounted above the table opposite the opening between the pair of feed rolls, but in staggered relation thereto, a stub shaft extending from the grooved idler pressure roll through a slot in the table and rigidly attached to a slide mounted below the table, an ear projecting from the slide to which is connected a clevis attached to the forward end of a reciprocable rod adapted to advance the grooved idler pressure roll and thereby engage the opposite side of the band between the continuously rotating feed rolls, whereby the band is simultaneously bent and advanced, and a stop for gaging the forward movement of the slide, thereby controlling the circular diameter of the bands.

3. In a band bending machine, a receiving table, a pair of continuously rotating grooved feed rolls adapted to engage one side of the band, one of said grooves being wider and deeper to allow the head of said band to pass without injury, a grooved idler pressure roll movably mounted on a stub-shaft adapted to engage the opposite side of the band between its contacts with the pair of continuously rotating grooved rolls, said stub-shaft extending downwardly from the grooved idler pressure roll through a slot in the table and rigidly secured to a slide mounted beneath the table, reciprocating means mounted below said table and connected to said slide, a stop adapted to limit the forward movement of the slide, whereby the grooved pressure roll is advanced to the extent desired for bending the band continuously, an incline mounted on the table adapted to raise the forward end of the band as it nears completion and allow it to pass over the tops of the rolls.

In testimony whereof I hereto affix my signature in the presence of two witnesses.

CHARLES N. REPLOGLE.

Witnesses:
Y. F. GROGAN,
ELMER SEAVEY.

---

Copies of this patent may be obtained for five cents each, by addressing the "Commissioner of Patents, Washington, D. C."